Feb. 24, 1959   W. H. ROYER   2,874,650
LEVEL OVEN UNLOADER
Filed Oct. 17, 1955   3 Sheets-Sheet 1

INVENTOR.
Wayne H. Royer
BY
Otto Moeller
Attorney

Feb. 24, 1959 W. H. ROYER 2,874,650
LEVEL OVEN UNLOADER
Filed Oct. 17, 1955 3 Sheets-Sheet 2

INVENTOR.
Wayne H. Royer
BY
Otto Moeller
Attorney

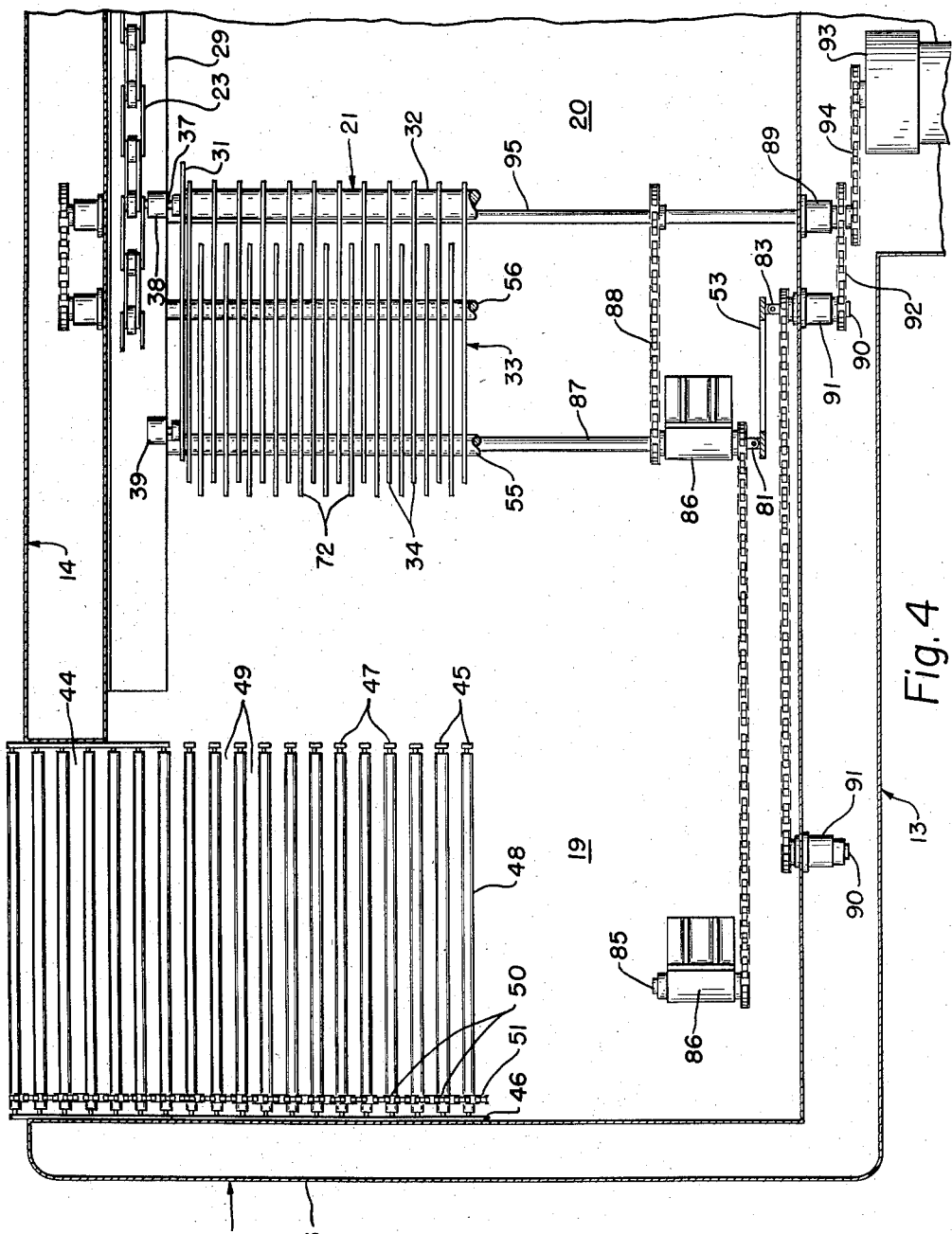

United States Patent Office 2,874,650
Patented Feb. 24, 1959

2,874,650

LEVEL OVEN UNLOADER

Wayne H. Royer, York, Pa., assignor, by mesne assignments, to Capital Products Corporation, Mechanicsburg, Pa., a corporation of Pennsylvania Application October 17, 1955, Serial No. 540,667

5 Claims. (Cl. 107—57)

This invention relates to a traveling tray type oven and particularly to means for unloading pans of baked goods from the oven trays. The oven to which the present invention is particularly adapted comprises an endless conveyor traveling in a closed loop in the baking chamber, the conveyor being provided with a series of equidistantly spaced trays having a pan supporting shelf comprised of a plurality of laterally spaced longitudinally extending rods secured at their rearward ends to a transversely extending rear element of the trays.

It is customary in order to unload the pans of baked goods from the oven trays, to tilt the trays as they approach the front of the oven adjacent their arcuate path of travel from the lower to the upper run of the tray conveyor, thereby permitting the pans to slide by gravity from the trays onto a transversely extending take away conveyor that transports the pans from the oven. Such tilting of the trays to unload the pans of baked goods is objectionable, particularly in the case of pies or cakes having a soft filling, since the filling material has a tendency to flow resulting in an imperfect final product. In addition, the pans of baked goods are subject to severe shocks as they slide off the tilted tray and strike the take away conveyor, so that particularly in the case of rolls, they are at times jarred out of the tilted pans, and of course such shocks while the pans are tilted aggravate the flow of soft fillings in pies and cakes. It is consequently a primary object of the present invention to provide in an oven, unloading means for pans of baked goods to overcome these objections and that maintains the pans of baked goods in a level horizontal position throughout the removal of the pans from the oven trays, and the transporting of the pans to and depositing them on the take away conveyor.

Another object is to provide a level unloader of the type described adapted to unload pans of baked goods from the oven trays while the tray conveyor is continuously traveling, thereby eliminating the necessity of stopping the tray conveyor when the pans of baked goods are removed therefrom.

A further object is to provide a level unloader wherein the pans of baked goods are positively supported throughout their removal from the oven trays and their transfer to and depositing thereof on the take away conveyor, so that the pans are at all times retained in positive manner and uncontrolled movement thereof is avoided.

The foregoing objects and advantages of the present invention, together with various other objects and advantages thereof which will become apparent, may be attained with the exemplary embodiment of the invention which is described in detail hereinafter and which is illustrated in the accompanying drawings.

Referring to the drawings:

Figure 4 is a sectional plan view, taken substantially as indicated on line 4—4 of Figure 2.

Figure 1:
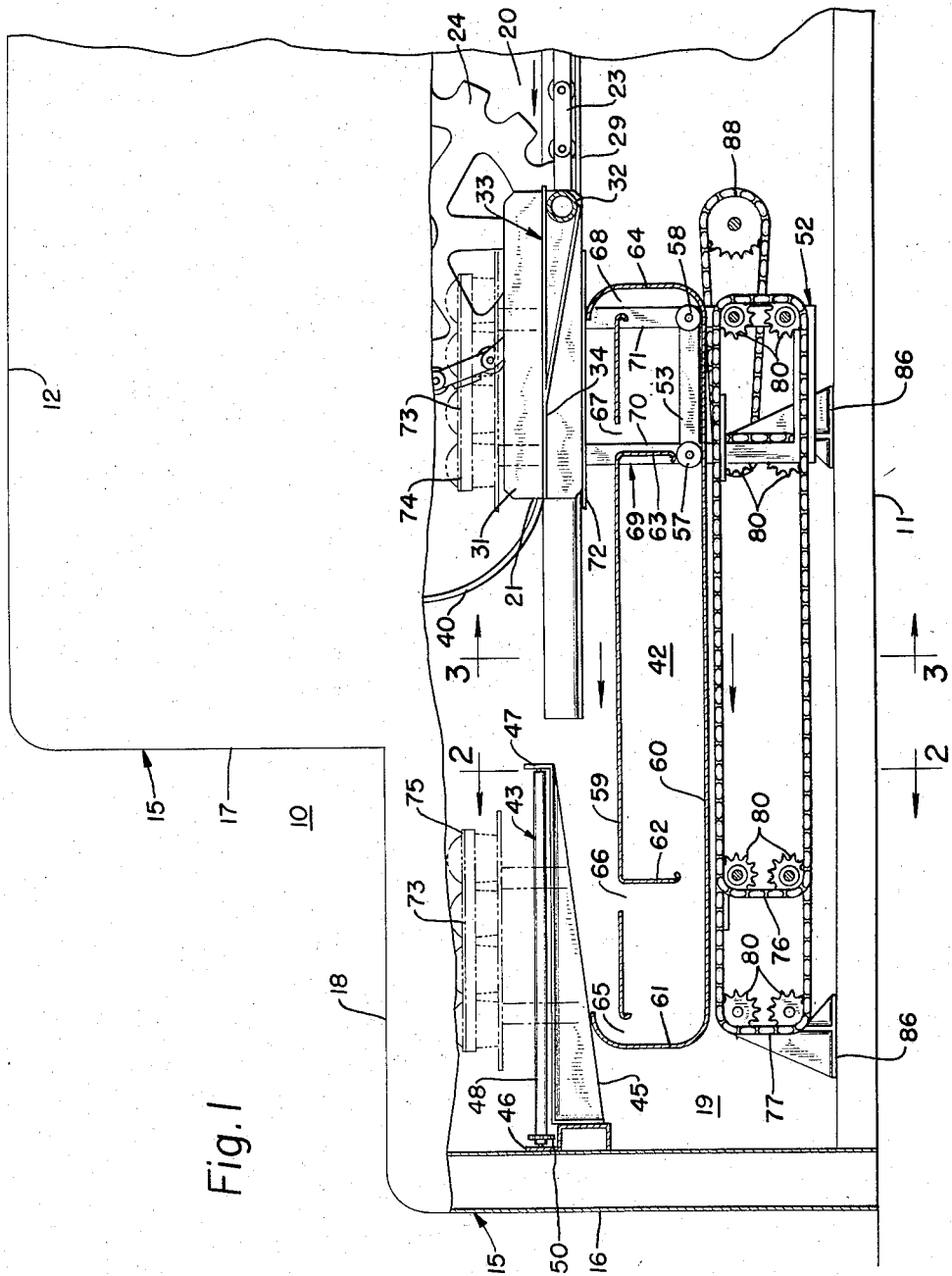
Figure 1 is a longitudinal section through the front portion of the baking oven embodying the present invention, taken substantially as indicated on line 1—1 of Figure 3, and parts being shown in elevation.

In the construction illustrated in the drawings, the baking oven is indicated generally at 10, only the front portion thereof incorporating the novel unloading means being shown. The oven 10 is of generally rectangular construction including a base or floor 11, top wall 12, side walls 13 and 14, and a front wall 15. The lower front wall portion 16 is offset forwardly with respect to the upper front wall portion 17, their upper and lower ends, respectively, being joined by a horizontal wall or loading shelf 18, providing therebeneath a compartment 19 adapted to accommodate part of the oven unloading mechanism. The compartment 19 is in open communication with the main oven chamber 20 into which a portion of the oven unloading mechanism extends. The walls of the oven, as is customary, are formed by inner and outer spaced sheets between which suitable insulating material may be interposed and which may also accommodate drive elements and other appurtenances.

The upper front wall portion 17 is provided with an opening, not shown, through which the pans of dough to be baked are delivered from the loading shelf 18 to the oven trays 21 carried by endless chains 22 and 23 disposed respectively adjacent the near side wall 13 and the far side wall 14. The chain 23 is trained around a sprocket 24, mounted on the transversely extending through shaft 25 at the forward end of the oven chamber 20. The shaft 25 is journaled at its ends in suitable bearings carried by the inner sheets of the side walls 13 and 14. Chain 22 is trained around a sprocket 26, mounted on a transverse stub shaft 27, spaced forward of the through shaft 25. In conventional manner, and therefore not illustrated in the drawings, the chains 22 and 23 extend horizontally through the oven chamber toward the rear thereof, where they may be trained over sprockets similar to the sprockets 24 and 26.

As shown in the drawings, the lower runs of the chains 22 and 23 are supported by tracks 28 and 29, respectively, which are secured in suitable manner to the inner sheets of the side walls 13 and 14, respectively. The chains 22 and 23 are thus prevented from sagging. The upper runs of the chains 22 and 23, while not shown, are similarly supported.

The trays 21 have longitudinally extending upright plate-like end members 30 and 31 secured at their rearward ends in any suitable manner, as by welding, to the opposite ends of a transversely extending bar 32. The pan supporting shelf 33 of the trays 21 is a grid-like form composed of a plurality of transversely spaced longitudinally extending rods 34 welded or otherwise secured at their rearward ends to the transversely extending bar 32.

Figure 3:
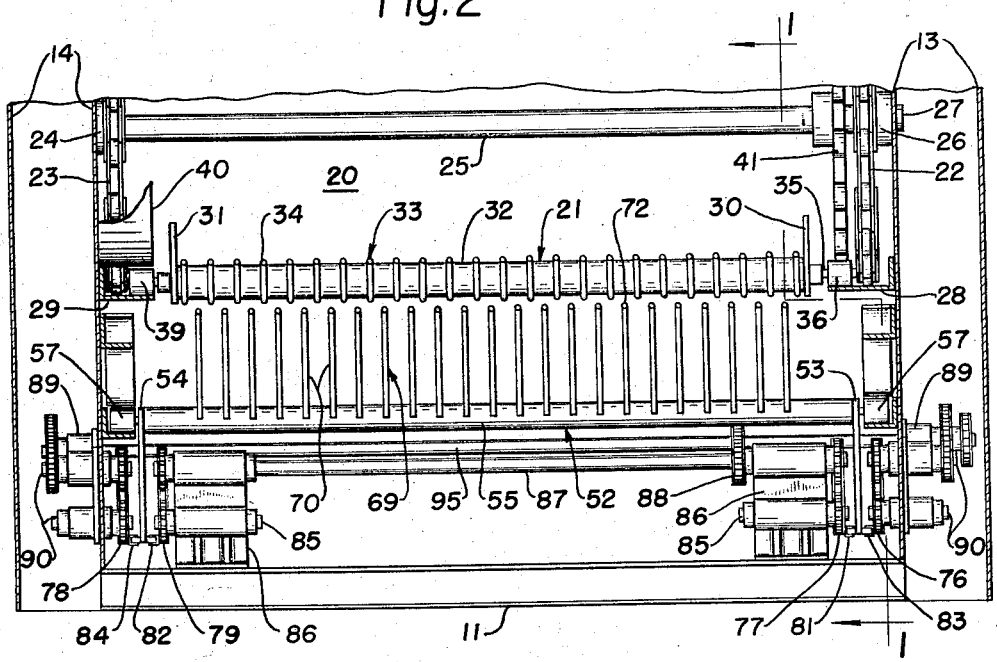
Figure 3 is a sectional view taken on the line 3—3 of Figure 1, looking toward the rear of the oven.

As previously stated, the trays 21 are carried by endless chains 22 and 23, being physically attached thereto at diagonally opposite corners. The near front corner of each tray 21 is connected to chain 22 by a pin 35, as shown in Figure 3, and mounted on the pin 35 between the end wall 30 of the tray and the chain 22 is a roller 36. The far rear corner of each tray 21 is connected to chain 23 by a pin 37, as shown in Figure 4, and mounted on the pin 37 between the end wall 31 of the tray and the chain 23 is a roller 38. The far front corner of the tray 21 is provided with a roller 39 as shown in Figure 4, and the near rear corner is provided with a similar roller, not shown. As the trays move along the lower horizontal run in the direction of the arrow in Figure 1, these rollers roll along the tracks 28 and 29, thereby maintaining the trays in horizontal position.

As the trays 21 move upwardly from the lower run to the upper run they are, as above explained, supported at their far rear and near front corners by the chains 23 and 22, respectively. The roller 39 at the far front corner of the tray 21 engages and rides along the outer side of a curved track 40 which is secured to the inner sheet of the far side wall 14. The roller at the near rear corner of the tray 21 engages a sprocket 41 which is mounted on the shaft 25 inward and rearward of the sprocket 26, as shown in Figure 3. In this manner the trays are stabilized and are maintained in a horizontal position as they move upwardly from their lower to their upper horizontal runs. While I have described one manner in which the trays 21 may be stabilized, it is to be understood that the other ways of stabilizing the trays, well known in the art, may be employed.

It is customary in unloading pans of baked goods from the oven trays, to provide means for tilting the trays at a point along the lower horizontal run thereof, whereupon the pans slide off the trays by gravity onto a take away conveyor. Such tilting of the trays with consequent tilting of the pans is objectionable, particularly with certain baked goods, such as pies.

In the present invention the trays 21 remain in horizontal position at all times, and the unloader, designated as a whole by the reference numeral 42, removes the pans of baked goods from the trays while retaining them in horizontal position, transports them in horizontal position to the take away conveyor 43 and deposits them thereon in horizontal position.

Figure 2:
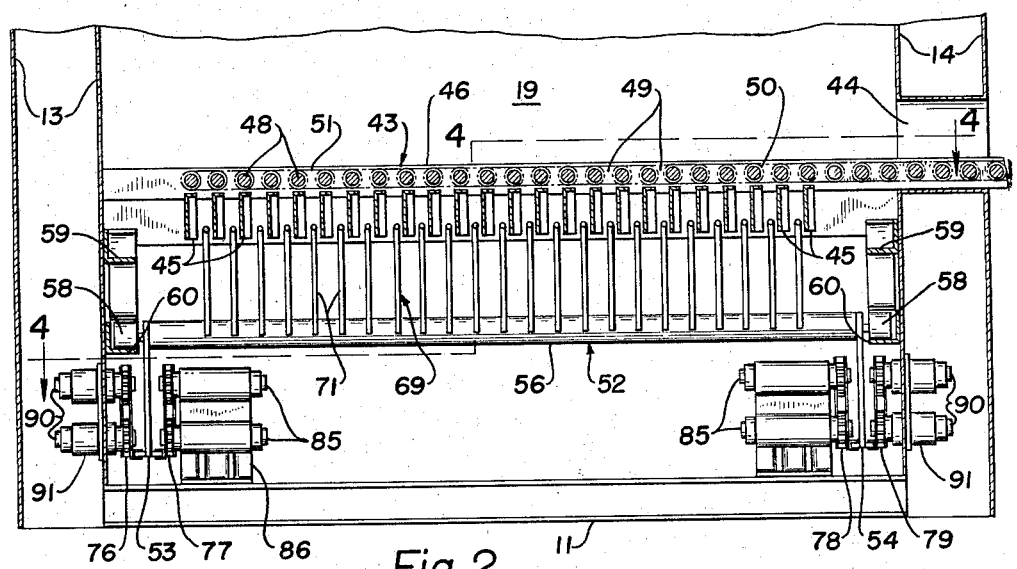
Figure 2 is a sectional view taken on the line 2—2 of Figure 1, looking toward the front of the oven.

The take away conveyor 43 is disposed in the chamber 19 forward of the horizontal lower run of the trays 21 and extends transversely along the lower front wall portion 16 of the oven, by which wall the conveyor 43 is supported. One end of the take away conveyor 43 projects through an opening 44 in the far side wall 14 of the oven as seen in Figures 2 and 4 of the drawings, whereby the pans of baked goods are conveyed from the oven. The conveyor 43 includes a plurality of longitudinally extending laterally spaced brackets 45 rigidly secured at their respective forward ends in any suitable manner to the inner sheet of the lower front wall portion 16 of the oven. Journaled at one end in a horizontal strip 46 adjacent wall portion 16 and at the opposite end in upturned projections 47 of the brackets 45 are the reduced ends of a plurality of rollers 48, the rollers 48 being in vertical longitudinal alignment with the brackets 45. It will be seen that spaces 49 are provided between each bracket together with its associated roller and an adjacent bracket together with its associated roller whereby access to these spaces, for a purpose to be later described, is provided through the free or rearward ends of the brackets and their associated rollers. Each of the rollers 48 carries a small sprocket 50 at its forward end adjacent the wall portion 16 of the oven, and an endless chain 51 is trained around the sprockets 50 in engagement with the teeth thereof. Suitable means, not shown, is provided for driving the endless chain 51 for operating the rollers 48.

The unloader 42 includes a carriage 52 comprising a pair of laterally spaced parallel upright rectangular frames 53 and 54, disposed respectively at the near and far sides of the oven. A transversely extending bar 55 is rigidly secured at its ends to the upper front corners of the frames 53 and 54, and a transversely extending bar 56 is rigidly secured at its ends to the upper rear corners of the frames 53 and 54, the frames 53 and 54 forming with the bars 55 and 56, a rectangular open box-like structure.

The carriage 52 is movable between a position beneath the forward end of the lower horizontal run of the trays 21 and a position beneath the take away conveyor 43. Means, to be described hereinafter, is provided for moving the carriage 52 in a rectangular path. To facilitate retention of the carriage in a level position during its movement in such rectangular path, the upper front corners of the rectangular frames 53 and 54 are provided at their outer sides with rollers 57 and the upper rear corners of the frames 53 and 54 are provided at their outer sides with rollers 58, which rollers 57 and 58 are arranged to engage tracks and guides. The rollers 57 and 58 have rolling contact with upper horizontal tracks 59 as the carriage 52 moves from right to left as viewed in Figure 1, the direction of movement of the carriage being indicated by an arrow. In moving from left to right, again as viewed in Figure 1, the rollers 57 and 58 of the carriage 52 have rolling contact with the lower horizontal tracks 60. As the carriage 52 descends from the upper tracks 59 to the lower tracks 60, the rollers 57 and 58 are respectively guided by vertical guides 61 and 62 constituting lateral extensions, respectively, of respective tracks 60 and 59, and as the carriage ascends from the lower track 60 to the upper track 59, the rollers 57 and 58 are respectively guided by vertical guides 63 and 64 also forming lateral extensions, respectively, of respective tracks 59 and 60. The tracks and guides 59, 60, 61, 62, 63 and 64 are secured in any suitable manner to the inner sheets of the oven side walls 13 and 14. The forward ends of the tracks 59 terminate short of the upturned guides 61 to form openings 65 therebetween, and adjacent the downturned guides 62 the tracks 59 are interrupted to form openings 66, the said openings 65 and 66 providing passageways for the rollers 57 and 58, respectively, as the carriage 52 descends from upper tracks 59 toward lower tracks 60. The rearward ends of the tracks 59 terminate short of the upturned guides 64 to form openings 68 therebetween, and adjacent the downturned guides 63 the tracks 59 are interrupted to form openings 67, the said openings 67 and 68 providing passageways for the rollers 57 and 58, respectively, as the carriage 52 ascends to the upper tracks 59.

The bars 55 and 56 of the carriage 52 have rigidly secured thereto a plurality of laterally spaced upwardly projecting pickup members 69. The pickup members 69 comprise longitudinally aligned upright fingers 70 and 71 on the bars 55 and 56, respectively, each aligned pair of fingers 70 and 71 being joined at their free ends by a longitudinally extending rod 72. The pickup members 69 are arranged to project through the spaces between the rods 34 of the trays 31 as the carriage 52 moves upwardly from the lower tracks 60 to the upper tracks 59 and in so doing lift the pans 73 from the trays 21, as shown in broken lines on Figure 1 and indicated by reference numeral 74. As the carriage 52 moves forward supporting the pans in horizontal position, the fingers 70 and 71 of the pickup members 69 enter the spaces 49 between the brackets 45 and their associated rollers 48, so that the rods 72 of the pickup members 69 support the pans at a level above the take away conveyor 43, as shown in broken lines in Figure 1 at 75.. As the carriage 52 descends from the upper tracks 59 to the lower tracks 60, in other words, to the position shown in full lines in Figure 2, the pans are deposited on the take away conveyor 43 which removes them from the oven through the opening 44. Thus throughout the transfer of the pans from the trays 21 to the take away conveyor 43, they are maintained in a perfectly horizontal position.

The operating means for the carriage 52 includes a pair of endless chains 76 and 77 at opposite sides, respectively, of the carriage frame 53, and a pair of endless chains 78 and 79 at opposite sides, respectively, of the carriage frame 54. As best shown in Figure 1, the chains 76, 77, 78 and 79 define a substantially rectangular longitudinally extending loop below the lower tracks 60. The rectangular shaped configuration of the chains 76, 77, 78 and 79 is maintained by training them over sprockets, all of which sprockets are designated by the reference numerals 80. Referring particularly to Figure 1, it will be seen that the chain 77 conforms with the rectangular configuration defined by the guides 61, 63 and the tracks 59, 60, and the chain 76 conforms with the rectangular configuration defined by the guides 62, 64 and the tracks 59, 60. In similar manner the chains 78, 79 conform with the tracks and guides adjacent the far side wall 14 of the oven. The lower front corners of the carriage frames 53 and 54 are pivotally attached to the inner chains 77 and 79, respectively, as indicated at 81 and 82, while the lower rear corners of the carriage frames 53 and 54 are pivotally attached to the outer chains 76 and 78, respectively, as indicated at 83 and 84. Thus, with the chains moving in the direction of the arrows in Figure 1, the carriage 52 will follow along the tracks 59 and 60 and guides 61, 62, 63 and 64 in the manner previously described.

The upper and lower sprockets 80 at the forward end of chains 77 and 79, and the lower sprockets 80 at the rearward end of chains 77 and 79 are mounted on stub shafts 85 journaled in bearing carriers 86 supported on the floor 11 of the oven. The upper sprockets 80 at the rearward end of chains 77 and 79 are mounted on a through shaft 87 by which the chains 77 and 79 are operated, the shaft 87 being journaled in the rear bearing carriers 86. The shaft 87 is driven through a sprocket and chain drive connection, indicated as a whole by reference numeral 88, from a through shaft 95 journaled at its ends in bearings 89 carried by the inner sheets of the oven side walls 13 and 14.

Sprockets 80 around which the chains 76 and 78 are trained, are mounted on stub shafts 90 journaled in bearings 91 carried by the inner sheets of the oven side walls 13 and 14. As best shown in Figure 4, the chain 76 is operated from the through shaft 95 by means of a sprocket and chain drive connection, indicated as a whole by reference numeral 92, connecting an extension of shaft 95 with an extension of one of the stub shafts 90. A similar drive connection is provided shaft 95 and the chain 78. Thus, the carriage conveyor chains 76, 77, 78 and 79 are driven in synchronism by the through shaft 95. The shaft 95 is driven from a transmission 93 through a sprocket and chain drive connection, indicated as a whole by the reference numeral 94, the transmission 93 being driven by a motor (not shown) which preferably also drives the tray conveyor chains 22 and 23. The sprockets and transmission for driving the tray conveyor conveying means and the carriage conveying means are arranged to move the trays 21 ahead one tray space for each complete cycle of movement of the unloader 42 so that as each tray 21 is in the position indicated in full lines in Figure 1, the unloader 42 is in position to remove the pans from the tray in the manner previously described and transport it to the take away conveyor 43. The distance traveled by the trays 21 per unit of time is considerably less than the distance traveled by the unloader 42 in the same unit of time, so that the pickup members 69 of the unloader 42 move out of the path of the transversely extending bar 32 of the trays 21, as the trays move in an arc from their lower to their upper run.

It will be seen that the pans may thus be unloaded during continuous movement of the trays 21, and this is an important feature of the invention. The invention is, however, not limited to unloading of the trays while continuously moving the trays, since it is apparent that the tray conveyor may be operated intermittently to stop each tray 21 at the unloading position and the unloader 42 may be operated continuously or intermittently in timed relation with the tray conveyor.

I claim:

1. A pan unloading device for use with a baking oven of the type having therein an endless traveling conveyor extending longitudinally of said oven and having trays carried by said conveyor including pan supporting shelves of the type having laterally spaced fingers extending longitudinally of the oven, said device including a horizontally disposed take away conveyor extending transversely of said oven and spaced longitudinally of one end of said tray conveyor, said take away conveyor including a plurality of longitudinally extending transversely spaced rollers, a carriage and means for moving and constraining movement of said carriage in a substantially rectangular path along an upper horizontal run from a position beneath a tray at the said one end of said tray conveyor to a position beneath said take away conveyor, along a descending run beneath said take away conveyor, along a lower horizontal run from beneath said take away conveyor to a position beneath a tray at the said one end of said tray conveyor, and along an ascending run beneath a tray at the said one end of said tray conveyor, and said carriage having laterally spaced pickup members projecting upwardly therefrom terminating in a common horizontal plane, said pickup members being of a height and disposed with respect to the fingers of a tray shelf to pass and project upwardly therebetween to lift the pans from said tray shelf on the ascending run of said carriage, and on the horizontal upper run of said carriage being adapted to pass between the rollers of said take away conveyor to supoprt the pans above said take away conveyor, and on the descending run of said carriage to pass downwardly through the spaces between said rollers to a position below the level thereof to deposit the pans on said take away conveyor.

2. An apparatus as defined in claim 1 wherein the rollers of said take away conveyor are longitudinally aligned with the fingers of said tray shelves.

3. An apparatus as defined in claim 1 wherein said means for moving said carriage includes carriage conveyor means, said carriage conveyor means comprising endless chain means disposed adjacent opposite sides of said carriage, and means connecting said carriage to said endless chain means.

4. A pan unloading device for use with a baking oven of the type having therein an endless traveling conveyor extending longitudinally of said oven and having trays carried by said conveyor including pan supporting shelves of the type having laterally spaced fingers extending longitudinally of the oven, said device including a horizontally disposed take away conveyor extending transversely of said oven and spaced longitudinally of one end of said tray conveyor, said take away conveyor including a plurality of transversely spaced rollers extending longitudinally of the oven, a rectangular frame like carriage disposed below the level of said tray conveyor and said take away conveyor and being movable from a position beneath said tray conveyor to a position beneath said take away conveyor, a pair of laterally spaced parallel endless traveling chains disposed adjacent each side of said carriage disposed wholly below the level of said tray conveyor and said take away conveyor, each chain defining a substantially rectangular loop disposed in a vertical plane, means connecting one of each of said pairs of chains to a respective front corner of said carriage and means connecting the other of each of said pairs of chains to a respective rear corner of said carriage, the chains connected to the rear corners of said carriage being offset rearwardly with respect to the chains connected to the front corners of said carriage whereby to move said carriage in a rectangular path, said carriage having upwardly projecting laterally spaced pick-up members adapted upon movement of the carriage in said rectangular path, to pass between and project upwardly through the fingers of a tray shelf to lift pans therefrom, to pass between the rollers of said take away conveyor to transport pans from said tray conveyor to a position above said take away conveyor, and to pass downwardly between the rollers of said take away conveyor to deposit pans thereon, and means for operating said chains to move said carriage in said rectangular path.

5. An apparatus as defined in claim 4 wherein said chains are offset a distance equal to the distance between the front and rear corner connections of the carriage with said chains whereby to maintain said carriage in a horizontal position throughout its travel in said rectangular path.

References Cited in the file of this patent

FOREIGN PATENTS

| | | |
|---|---|---|
| 696,122 | Great Britain | Aug. 26, 1953 |
| 849,430 | France | Nov. 23, 1939 |